US010067836B1

(12) United States Patent
Chopra et al.

(10) Patent No.: US 10,067,836 B1
(45) Date of Patent: Sep. 4, 2018

(54) CONFIGURATION BASED INTELLIGENT PROTECTION MODELING

(71) Applicant: EMC Corporation, Hopkinton, MA (US)

(72) Inventors: Shelesh Chopra, Bangalore (IN); Sadagopan Balaraman, Franklin, MA (US); Manuel Rodriques, Jr., Sutton, MA (US); Eric Matthies, Hopkinton, MA (US); Christopher Wroten, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 522 days.

(21) Appl. No.: 14/660,638

(22) Filed: Mar. 17, 2015

(51) Int. Cl.
*G06F 17/30* (2006.01)
*G06F 11/14* (2006.01)

(52) U.S. Cl.
CPC ...... *G06F 11/1451* (2013.01); *G06F 11/1464* (2013.01); *G06F 11/1469* (2013.01); *G06F 2201/80* (2013.01); *G06F 2201/84* (2013.01)

(58) Field of Classification Search
USPC .................................. 707/640, 644, 649
See application file for complete search history.

(56) References Cited

U.S. PATENT DOCUMENTS

2011/0246735 A1* 10/2011 Bryant ................ G06F 11/1448
711/162

OTHER PUBLICATIONS

EMC Corporation White Paper, EMC Protectpoint—A Detailed Review, Jul. 2014, 1-10 pages, Part No. H13261, EMC Corporation, USA.

* cited by examiner

*Primary Examiner* — Hung T Vy
(74) *Attorney, Agent, or Firm* — Workman Nydegger (57) ABSTRACT

In one example, a method for protecting data includes receiving input specifying a data backup process, consulting a resource map to identify backup resources that are available, and then checking a rules engine to identify a backup rule that matches the specified data backup process and that can be executed to perform a backup using the available backup resource. When a backup rule is identified that matches the specified data backup process and that can be executed to perform a backup using the available backup resources, the specified backup process is automatically performed using the identified backup rule.

19 Claims, 5 Drawing Sheets

| Rule ID | Rule Type | Rule Definition | Enable/Disable |
|---|---|---|---|
| XXX_1 | System | VMAXV3/SnapVX snapshot and if destination pool has "ProtectPoint device" then backup from V3GR to DD | Enable |
| XXX_2 | System | VMAXV3/SnapVX snapshot and if destination pool has NO - "ProtectPoint device" then ROLLOVER to media (V3GR to media) | Enable |
| XXX_3 | System | ProtectPoint snapshot and if destination pool has "ProtectPoint device" then DD to DD/CCR | Disable |
| XXX_4 | User | ProtectPoint snapshot and if destination pool has NO- ProtectPoint device then ROLLOVER the PP snapshot to media | Enable |
| XXX_5 | User | Rollover required and both tape and DD-OST available, backup to DD-OST | Enable |
| XXX_6 | User | Backup Media is DD and DD-IP and DD-FC is available, backup using DD-FC first | Enable |

CONFIGURATION BASED INTELLIGENT PROTECTION MODELING

FIELD OF THE INVENTION

Embodiments of the present invention generally concern data backup and restoration. More particularly, at least some embodiments of the invention relate to systems, hardware, computer-readable media, and methods directed to backup processes that employ rules for automatic selection of the best available configuration for performing a backup, notwithstanding ongoing changes in the configuration and availability of backup resources in the system.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

While data backup is a valuable and important function, the ever increasing volume of data that is generated presents significant problems. In particular, many companies today find their backup and recovery process strained as data growth in enterprise IT environment continues to accelerate at exponential rates, while data-protection solutions have struggled to keep pace. Backup performance is crippled by the needs of up-to-date and online business applications. Snapshot and replication operations of application data are key strategies to meet very demanding Service Level Objectives (SLO) such as Recovery Point Objectives (RPO) and Recovery Time Objectives (RTO).

In challenging environments such as these, conventional approaches to data backup typically fall short for any of a variety of reasons. For example, many legacy backup solutions are hard coded and thus lack flexibility. This lack of flexibility causes inefficiencies in that it can result in overutilization of some backup resources, and underutilization of other backup resources.

Another concern with conventional backup approaches is that they often require significant user involvement in the selection and configuration of resources for the backup. This user involvement can lead to user errors, miscalculations and misinterpretations. Moreover, user involvement can significantly slow the selection of systems and devices for a backup configuration and, accordingly, the speed with which the backup can be taken. More particularly, most backup applications ask users to create resources, define schedules, define mapping between a selected source and target device, define the actions and workflow, and define topologies. Because these functions must be performed manually by the user, user errors, delayed decisions and inefficient use of resources often result.

Finally, and as will be apparent from the foregoing, the customer experience with conventional backup approaches is not satisfactory. That is, such backup approaches require significant user involvement, and are not particularly easy to use.

In light of problems and shortcomings such as those noted above, it would be useful to be able to take a backup while automatically taking into account ongoing variations in system configurations and asset availability. It would also be useful to be able to take a backup using the best configuration available at the time of the backup. Finally, it would be useful to be able to define one or more acceptable configurations in advance of the backup.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally concern systems, hardware, computer-readable media, and methods directed to backup processes that employ rules for automatic selection of the best available configuration for performing data protection processes such as a backup, notwithstanding ongoing changes in the configuration and availability of backup resources in the system.

In general, embodiments of the invention are able to make intelligent data protection based decisions based on the resources, such as backup devices and zoning, that are available when the backup is taken. Thus, given a particular set of circumstances, the optimum decision concerning a backup or other data protection configuration can be made on the fly based on available configurations, and without depending upon user intervention. Thus, embodiments of the invention implement configuration based intelligent data protection processes.

It should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection.

In at least some implementations, a smart engine is provided that enables a user to specify, at a relatively high level, basic parameters of a desired data protection process. For example, a user could specify 'backup only,' 'backup+clone,' 'snapshot only,' or 'snapshot+rollover+clone.'

A resource map may be provided that identifies resources that could potentially be employed in a data protection operation. The resource map can be updated, in real time for example, or on some other basis, whenever a change occurs to an existing resource, and also when a new resource is added. Thus, the resource map can provide a continuously updated list of resources available for backups identified by the various rules.

A rules engine, which can be part of the smart engine in some embodiments, includes one or more sets of rules that are used to govern performance of various data protection processes. Because the rules are defined in advance, no user intervention is required to identify and configure system resources for the backup, or to execute the backup. Rather, those processes can be performed automatically. Among other things, the rules can define particular types of backups and can specify which resources are to be utilized for the backup. If desired, multiple rules can be specified and the rules applied in any suitable order, such as by way of preference for example. The rules engine communicates with the resource map to determine which resources are available for data protection operations specified by the rules. Rules can be enabled and disabled automatically and/or manually such as by a user, based upon availability of resources as indicated by the resource map. In other instances, rules can be enabled and/or disabled based upon criteria other than the resource availability specified by the resource map.

In operation, the smart engine checks the resource map to determine which resources are available for a data protection operation. Once the available resources have been identified, the smart engine then determines the optimum data protection rule that can be implemented, given the resources that have been indicated to be available.

By way of illustration, it may be relatively more desirable to take a snapshot and backup the snapshot to a hardware device than to back up the snapshot to media, such as tape for example. However, if the hardware devices is indicated by the resource map as being unavailable, the optimum data protection rule becomes the rule that specifies backup to media. In any case, once the optimum data protection rule is identified, the corresponding data protection operation can then be performed. Upon completion of the data protection operation, the user and/or other entities can then be notified.

Advantageously then, embodiments of the invention provide flexibility in implementing data protection processes because such embodiments take into account the resources that are available at the time the desired process is to be performed. Moreover, because a data protection process is selected based upon resources that have been determined to be available, data protection can be implemented notwithstanding ongoing changes to the availability of resources. Finally, because the rules that define the data protection processes are configured in advance, no user intervention is required to identify and implement the most optimal or preferred data protection process.

A. Example Operating Environments

In general, embodiments of the invention may include and/or be implemented in an operating environment that includes one or more clients that include data that is desired to be protected in some way. The clients can communicate with a backup server and may include one or more applications which generate, and/or cause the generation of, data which is desired to be backed up for later restoration to the client and/or one or more other target machines. The clients and the target machines can be physical machines or virtual machines (VM), though neither type of machine is required for any embodiment. As used herein, the term data is intended to be construed broadly and includes, by way of example and not limitation, data blocks, atomic data, emails, objects, files, directories, volumes, and any group of one or more of the foregoing.

Figure 1:
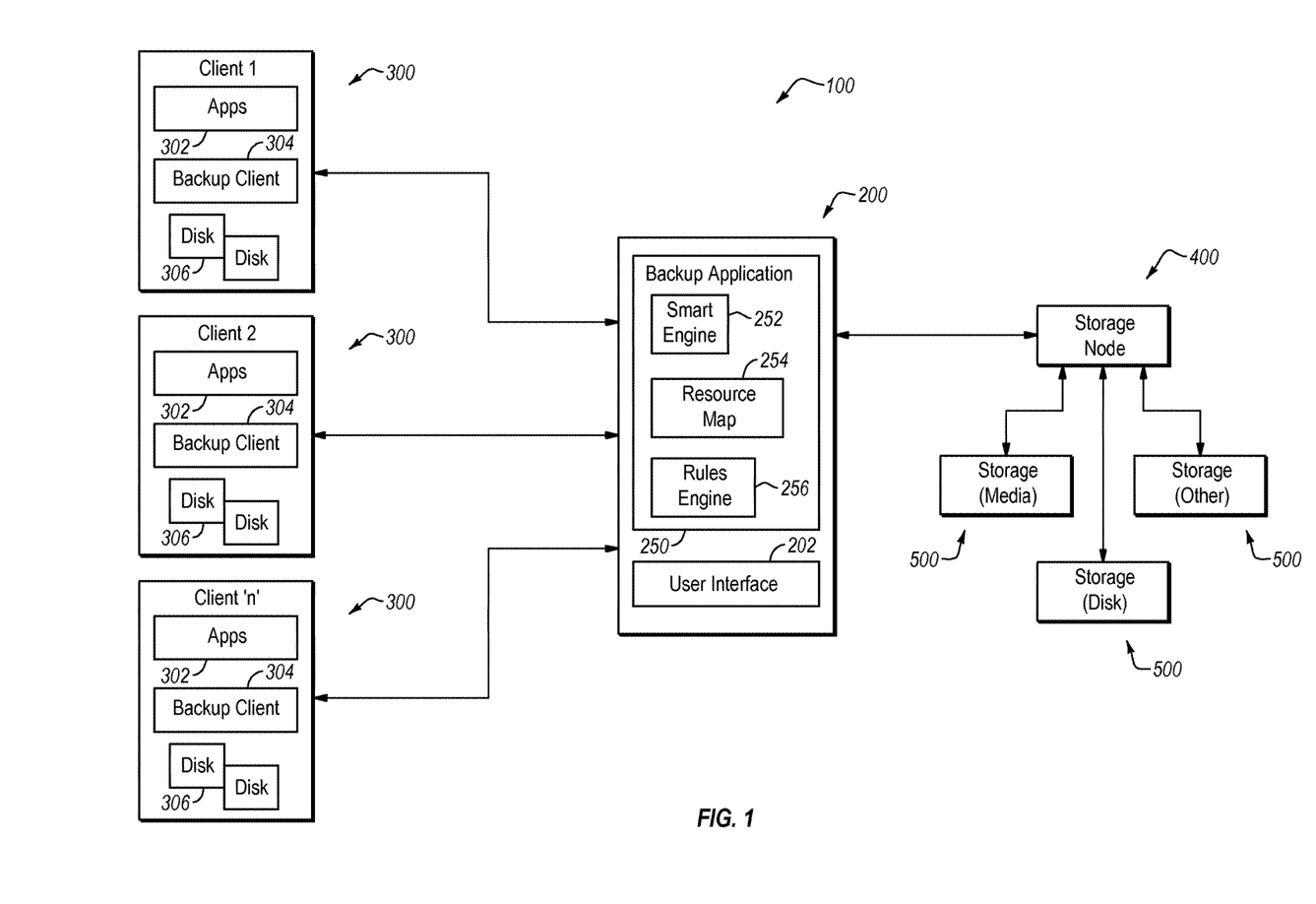
FIG. 1 is directed to aspects of an example operating environment for at least some embodiments.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. For example, one or more nodes, discussed below, may comprise elements of a cloud computing environment. The environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a backup server 200 configured for communication with one or more nodes, such as one or more clients 300, and a storage node 400. The storage node 400 can communicate with, or include, various types of storage 500. In general, backups of one or more of the clients 300 can be made by cooperation between the backup server 200 and the client 300, and the backups can then be stored by the backup server 200 at the storage node 400. Subsequently, one or more of the stored backups can be restored to one or more of the clients 300 and/or any other target(s). The backup server 200, clients 300, storage node 400 and/or target(s) may be physical machines, virtual machines (VM), or any other suitable type of device. As well, some or all of the storage 500 can be implemented as physical or virtual devices.

In one alternative to the arrangement of FIG. 1, the storage node 400 can be replaced with, or constitute, a primary storage device that communicates with the backup server 200. The primary storage device, in turn, may communicate with a data domain, which may incorporate the EMC Corp. DataDomain backup technology, that includes one or more storage devices where backups can be retrievably stored. The storage devices of the data domain can include, for example, an onsite retention storage device or array, and also an offsite disaster recovery (DR) storage device or array.

With particular reference first to the backup server 200, some embodiments may employ a backup server 200 in the form of an EMC Avamar server or NetWorker server, although the scope of the invention is not limited to those example servers. The backup server 200 includes a backup application 250 that participates in the generation of backups, and the backup server 200 also includes a user interface 202 that enables a user to interact with the backup application 250. The user interface 202 can include, for example, a graphical user interface, mouse, keyboard, stylus, and/or any other display and input or output devices. Example implementations of the backup application 250 are discussed in more detail below.

One or more of the nodes, such as client 300, with which the backup server 200 communicates can take the form of a server. It is not required that the server be any particular type of server. One or more of the client(s) 300 include any of various applications 302 that generate data that is desired to be protected. As well, the client(s) 300 can each include a respective instance of a backup client 304 that generally operates in cooperation with the backup application 250 of the backup server 200 to create one or more backups that include data that is resident on storage media 306, such as disks for example, of the client 300.

B. Example Backup Applications and Components

With more particular reference now to the backup server 200, further details are provided concerning a backup application, one example of which is dented at 250. The backup application 250, which can take the form of executable code carried by non-transitory storage media, can include a smart engine 252, a resource map 254, and a rules engine 256. In the discussion below concerning these elements, various functionalities are addressed and it should be appreciated that the allocation of functionalities among these elements is presented by way of example only and in other embodiments, the functionalities can be allocated in any other suitable way. Moreover, while the smart engine 252, resource map 254, and rules engine 256 are indicated as resident at the backup server 200, those elements need not be resident together with each other, nor in any particular location. Instead, the smart engine 252, resource map 254, and rules engine 256 can be located anywhere in the network 100 where they are able to carry out the functions disclosed.

In general, the smart engine 252 uses the resource map 254 and rules engine 256 to identify an optimum data protection process in view of available resources, and the smart engine 252 then executes, or causes the execution of, the identified data protection process. In at least some embodiments, one or more of the smart engine 252, resource map 254, and rules engine 256 can be controlled by a user using the user interface 202. By way of example, a user can specify, by way of the user interface 202, a high level type of data protection to be implemented. With this high level information, and using the rules and resource availability information, the smart engine 252 can then carry out data protection processes consistent with the high level data protection type that was specified by the user. Examples of high level data protection types that can be specified by a user include, but are not limited to, 'backup only,' 'backup+ clone,' 'snapshot only,' or 'snapshot+rollover+clone.'

Figure 2:
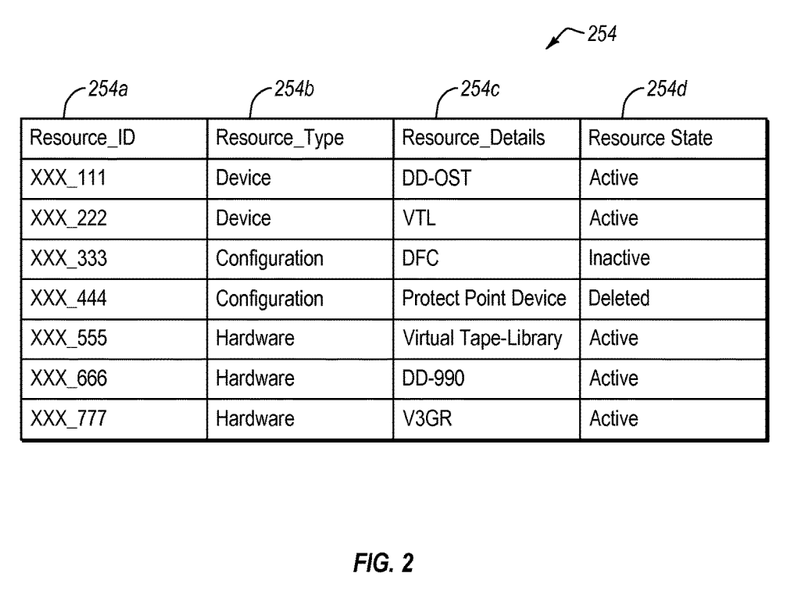
FIG. 2 is directed to an example implementation of a resource map that may be employed with at least some embodiments.

With continued attention to FIG. 1, and directing attention now to FIG. 2 as well, details are provided concerning a resource map, one example of which is denoted at 254. Although the resource map 254 is indicated as being resident at the backup server 200, that is not required, and the resource map 254 can reside anywhere where it is accessible by the smart engine 252, and where it can be updated. In general, the resource map 254 includes information concerning resources such as configuration, hardware, and devices for example, that may potentially be available for use in connection with one or more data protection processes. For example, any of the listed resources can indicate storage media and/or location where a backup can be stored for later restoration to one or more target devices.

The resource map 254 may be updated automatically, or by a user, upon a change in status of one or more of the listed resources, upon addition/deletion of a resource to/from the resource map 254, and/or at any other suitable time or in response to occurrence or non-occurrence of one or more particular events. The resource map 254 can additionally or alternatively be updated on a regularly scheduled basis. In at least some embodiments, changes to the resource map 254 are communicated to user by a message or other type of communication. In some embodiments, the listed resources may communicate their status directly, and automatically, to the resource map 254. As well, the resource map 254 can be presented in graphical form, for example, to a user by way of the user interface 202.

In the illustrated example, the resource map 254, which can include a listing of physical and/or virtual resources, can include information such as a Resource_ID 254a, Resource_Type 254b, Resource_Details 254c, and Resource State 254d. The Resource_ID 254a can be any identifier that uniquely denotes the particular resource that may potentially be used in a data protection process. The indicated Resourc_ID 254a information and format are presented only by way of illustration. The Resource_Type 254b identifies the general nature of the resource, such as 'device,' 'configuration,' or 'hardware,' for example. The Resource_details 254c provide information about the particular type of device.

In the illustrated example of the resource map 254, example Resource_details 254c include DD-OST (i.e., the EMC Corp. DataDomain-Open Storage Technology). The DataDomain technology is a data deduplication backup and storage technology, and associated appliance, developed by EMC Corp. In general however, other suitable data deduplication backup technologies can alternatively be used. The DD-990 listed in the Resource_details refers to a particular model of DataDomain.

Another example resource detail is VTL (Virtual Tape Library), DFC (i.e., EMC Corp. DataDomain Boost over FibreChannel). In general, the DataDomain (or DD) Boost works by distributing parts of a data deduplication process to a backup server or application client so only unique data segments get sent to the Data Domain System. In general, the VTL or Virtual Tape-Library resource is a disk-based backup system, namely, a virtual tape library that emulates one or more physical tapes.

The example Resource_details 254c list further includes a Protect Point Device, which is a device that can be used in connection with the EMC Corp. ProtectPoint technologies. In general, the ProtectPoint technology operates to protect data by copying the data directly from its source (the primary storage) to the destination (protection storage) by way of the most efficient path and with little or no impact on the associated application(s). Further details concerning the ProtectPoint technologies can be found in the EMC Corp. white paper entitled 'EMC PROTECTPOINT—A Detailed Review,' dated July 2014, and incorporated herein in its entirety by this reference.

Finally, the resource map 254 lists V3GR, which is a particular version of the EMC Corp. Symmetrix networked storage system. Of course, other storage systems could alternatively be employed, and the scope of the invention is not limited to any of the EMC Corp. products or platforms disclosed herein.

With continued reference to FIG. 2, and as noted earlier, the example resource map 254 can also indicate the state of each of the listed resources. Some examples of resource state 254d information include, but are not limited to, 'Active' (available for use with a data protection process), 'Inactive' (temporarily unavailable for use with a data protection process for one or more reasons, e.g., already committed, or temporarily offline for maintenance). In some embodiments, the resource map 254 can also list devices as 'Deleted.' Such devices are no longer part of the resource pool and, as such, are unavailable for use with a data protection process unless or until they are added back to the resource pool.

It should be understood that the foregoing are only examples of state information that could be used in a resource map, and any other information concerning the state of a particular resource could additionally, or alternatively, be employed. For example, another state that could be used is 'In Service' for resources that are presently in use, and an 'Estimated Time For Availability' could be used to indicate when a resource is next expected to be available. As well, resource state 254d information for a particular resource can include multiple indicators such as 'In Service'+'Estimated Time for Availability' for example. In some instances, one or more fields of the resource map 254 can include hyperlinks embedded in the displayed information so that a user can click the link to obtain further information concerning that resource, if desired.

With continued reference to FIG. 2, and brief reference again to FIG. 1, it can be seen that the resources listed in the resource map 254 may correspond to various types of storage 500 that may be accessible to the backup application 250 for retrievable storage of data. The data can be deduplicated by the backup application 250 prior to storage. As indicated in FIG. 1, example storage types for backups performed in connection with various embodiments of the invention include optical and/or magnetic disk, media such as tape for example, or any other media on or in which data can be retrievably stored. The storage 500 media can be any virtual and/or physical media. In at least some embodiments, the storage 500 is part of, or is otherwise associated with, a storage node 400.

Figure 3:
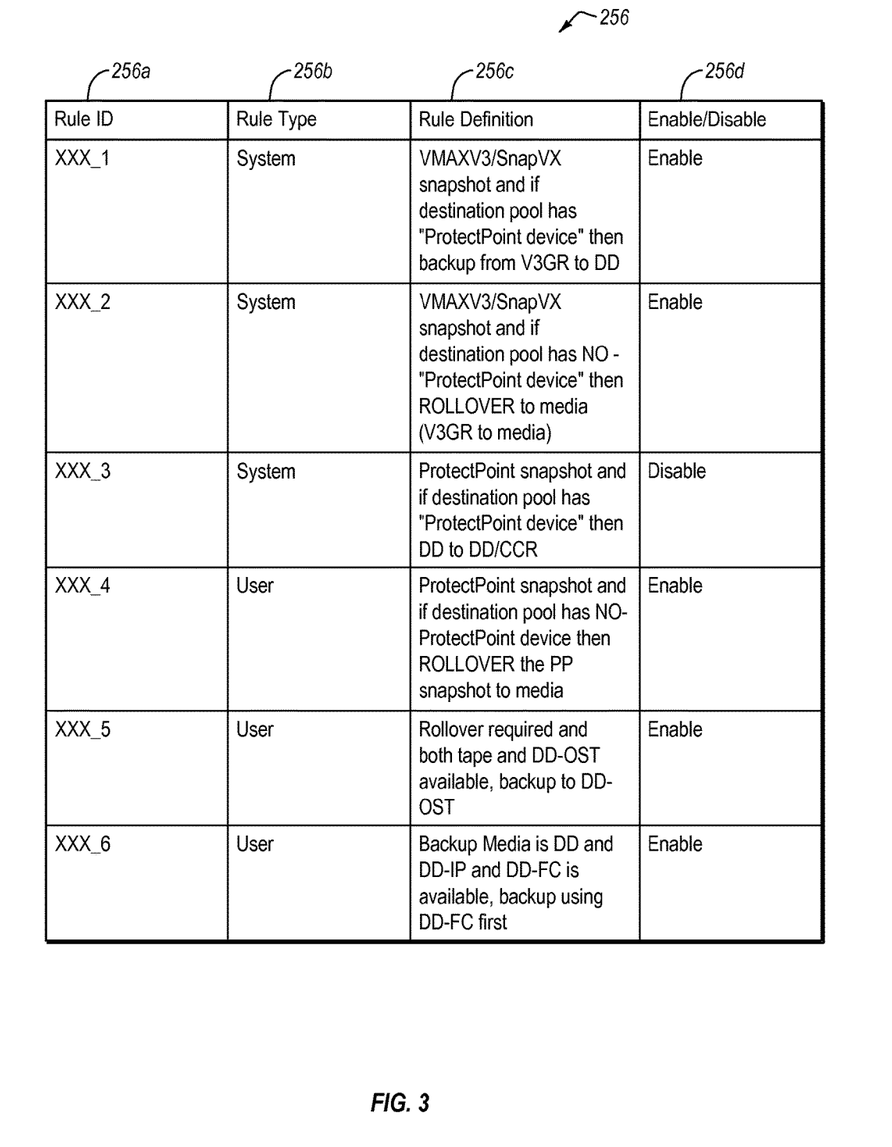
FIG. 3 is a diagram of an example rules engine and associated rules.

Turning now to FIG. 3, and with continued attention to FIGS. 1 and 2 as well, further details are provided concerning an example rules engine 256. In the illustrated example, the rules engine 256, which generally includes a listing of rules that each defines or corresponds to a backup process having particular characteristics. in some cases, more than one rule may be applied to a particular backup process. The rules engine 256 can include any information relating to the ruleset. For example, the rules engine 256 may include information such as a Rule ID 256a, Rule Type 256b, Rule Definition 256c, and information 256d as to whether a particular rule is enabled or disabled. Similar to the Resource_ID 254a, the Rule ID 256a can be any identifier that uniquely denotes the particular rule that may potentially be used in a data protection process.

Among other things, a Rule Type 256b can be defined by its scope or applicability. In the illustrated example, one Rule Type 256b indicates that the associated rule is a 'System' rule that can be defined by the system and/or a user. Another Rule Type 256b indicates that the associated rule has been defined by a particular 'User.' In yet other examples (not shown), a Rule Type is provided that indicates the associated rule applies to a particular 'Application' (e.g., Microsoft Outlook) and/or to a particular 'Application Type.' (e.g., a word processing application, email application, or other particular type of application). As the foregoing examples illustrate, one or more rules can be devised that identify any desired basis for performance of a data protection process and, accordingly, the scope of the invention is not limited to these illustrative examples.

With continued reference to FIGS. 1 and 2, the rules engine 256 also includes one or more Rule Definitions 256c, some examples of which are set forth in FIG. 3. Following is a discussion of some generic rules to illustrate the rules concept, and then discussion of some examples of specific rules as set forth in FIG. 3. In any of the disclosed examples, including those noted immediately below, virtual media, physical media, or a combination of the two can be used to store backups, rollovers and clones. Similarly, backups can be performed of VMs, physical machines, or both.

Rules can range from simple to complex. One example of a relatively simple rule is a 'backup only' rule which indicates that a backup is to be taken of production data, and the backup stored at a backup device/media. The backup can be any type of backup. In one particular instance, the backup takes the form of a snapshot.

Another, somewhat more involved, example of a rule is a 'backup+rollover' rule. In this scenario, a backup is taken and stored on backup device/media. Additionally, in this example, the backup, which can be a snapshot for example, is copied to a secondary backup media. Thus, the 'rollover' refers to the notion that the snapshot copy is also copied to storage media. Again, the backup that is taken can be any type of backup, such as a snapshot for example. The backup device/media can be the same, or different from, the secondary backup media. For example, the backup device could be a hard disk, and the secondary backup media could be tape.

A further variation of a backup scenario that can be specified by rule is a 'backup+clone' rule. In this case, a backup is taken and stored on a primary backup device. Afterwards, a copy of the backup is made and stored on a secondary backup device. The primary and secondary backup devices may or may not have the same configuration as each other.

As a final example, a 'backup+rollover+clone' rule can be defined and employed. With reference to the particular case of snapshots, a snapshot is first taken of data that is desired to be protected. Next, the snapshot is stored on a backup device. Additionally, the snapshot is copied to backup media. As a result, there are two copies of the snapshot, each of which is stored in a different respective place and/or on different respective media.

It will be appreciated from the foregoing discussion, and the rest of this disclosure, that an unlimited number of rules can be defined and employed by combining data protection operations and media in various ways. Some particular rules embodying various such combinations are discussed in more detail below.

In general, the Rule Definitions 256c can take any desired form. In some instances, one or more of the Rule Definitions 256c are in an 'if X is true, then do Y' form, although this form is not required and any other form(s) can additionally, or alternatively, be employed. Moreover, a rule can include, or reflect, a decision tree type of structure that includes multiple 'if, then' conditions, one or more of which takes, as its input or premise, the response to another of the conditions. As well, one or more 'if, then' conditions can be combined with other information such as the particular type of backup to be performed. It will be appreciated that the 'if, then' condition can be expressed in a variety of ways, example of which include 'if not X, then Y,' 'if X and Y, then Z,' 'if X or Y, then Z,' and 'if X or Y, then not Z,' or any combination of these.

As indicated in FIG. 3, the indicated Rule Definitions 256c each state or imply at least one condition. For example, the Rule Definition for Rule XXX_1 indicates that a particular type of snapshot will be taken and, if the destination resource pool has a ProtectPoint device that is active, the snapshot will be backed up from the V3GR model of Symmetrix to a disk drive (DD) that may be physical or virtual. In contrast, the Rule Definition for Rule XXX_2 provides an alternative to Rule XXX_1. That is, and similar to Rule XXX_1, a VMAXV3/SnapVX snapshot will be taken and if the destination resource pool does not have a ProtectPoint device, for example, that is active, then the backup process will roll over to an alternative destination resource instead, namely, media such as storage 500, in this case. Rule XXX_4 is similar to Rule XXX_2.

Rule XXX_3, like Rules XXX_2 and XXX_1, is a system rule and specifies that a snapshot, particularly a ProtectPoint snapshot, is to be taken and if the destination resource pool has a ProtectPoint device that is active, the snapshot is to be backed up, using the DataDomain application, to a DataDomain Continuous Cluster Replication (CCR) resource. A Single Copy Cluster (SCR) or Standby Continuous Replication (SCR) resource could alternatively be used in placed of the CCR resource. Finally, in the illustrated example, Rule XXX_3 has been disabled. A rule can be disabled automatically, such as if a required backup resource is not Active, and a rule can also be disabled by a user having the appropriate privileges for example.

With continued reference to FIG. 3, Rules XXX_5 and XXX_6 are user-based rules that have been defined by one or more users. In the particular example of Rule XXX_5, a user has indicated that where a DataDomain (Open Storage Technology) and tape are both available for storing a backup, the backup, in whatever form it may take, is to be stored in the DataDomain storage. In the example of Rule XXX_6, the rule specifies a hierarchy to be applied if a plurality of backup resources are available. In particular, if the backup resource is DataDomain storage, and there are different respective types of communication protocols associated with that storage, such as FibreChannel (FC) or Internet Protocol (IP), the backup should be performed using FC DataDomain storage as the first choice.

C. Example Host Configuration

Figure 4:
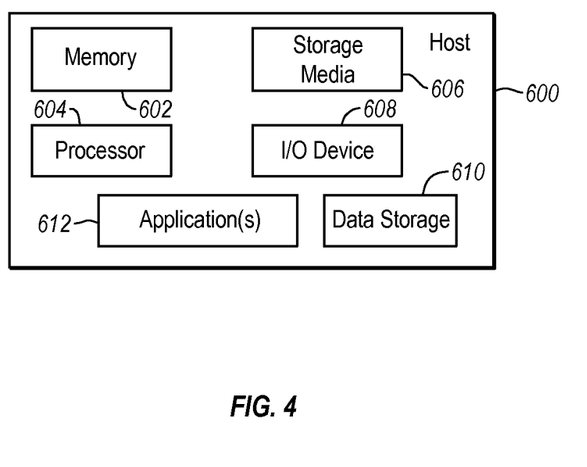
FIG. 4 is directed to an example configuration of a computing system.

With reference briefly to FIG. 4, one or more of the backup server 200, clients 300, or storage node 400 can take the form of a physical computing device, one example of which is denoted at 600. In the example of FIG. 4, the computing device 600 includes a memory 602, one or more hardware processors 604, non-transitory storage media 606, I/O device 608, and data storage 610. As well, one or more applications 612 are provided that comprise executable instructions. Such executable instructions can take the form of one or more of a backup application, a backup client, a manager client, or a manager application.

D. Example Backup Methods

Figure 5:
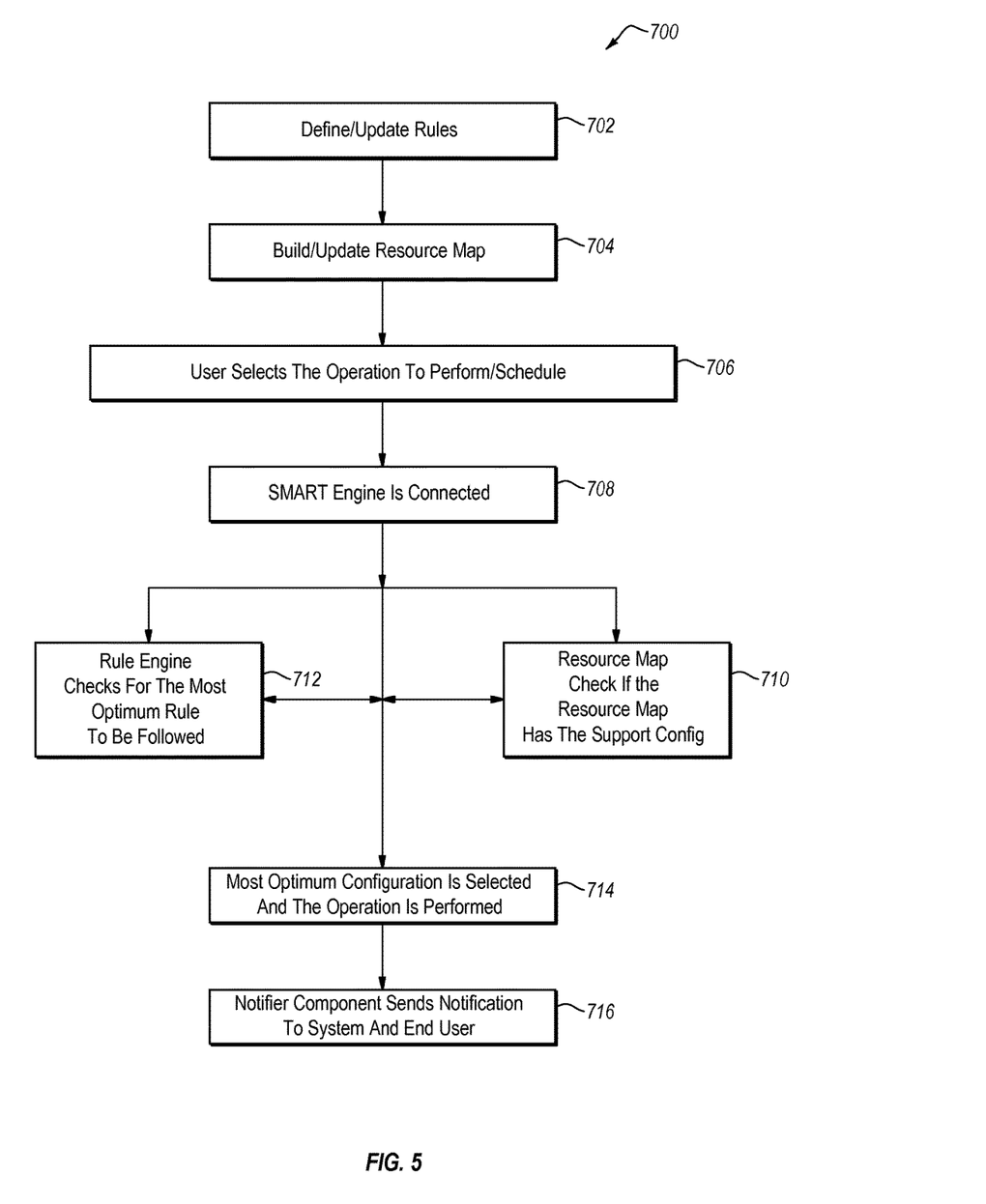
FIG. 5 is a workflow diagram disclosing aspects of a data protection process.

Directing attention now to FIG. 5, details are provided concerning aspects of methods relating to performance of a configuration based backup, one example of which is denoted at 700. In general, and as noted herein, methods and processes such as the method 700 can be used to take a backup of data, notwithstanding ongoing changes to the availability of resources that can be employed for backup processes in the system where the method 700 is performed. That is, given a particular set of circumstances, the optimum decision concerning a backup or other data protection configuration can be made on the fly based on available configurations, and without depending upon user intervention.

Initially, an administrator or other user can define/update and store 702 one or more data protection rules. The data protection rules can take the form of an element of a smart engine, although that is not necessarily required. The data protection rules can be defined by a user, in some embodiments at least, by way of a user interface connected with a backup server. Additionally, or alternatively, one or more data protection rules can be defined by the system in connection with which the rules engine operates.

After, or prior to, definition/updating and storage 702 of the data protection rules, a resource map is built 704. In general, the resource map can include a list of resources, such as devices, configurations, and hardware, for example, that may be needed, or at least usable, for a variety of different data protection processes. Accordingly, not every resource listed in the resource map is necessarily required for all data protection processes. Moreover, one or more listed resources may be usable for more than one data protection process.

The resource map can be user-accessible, and may also be connected to the resources in a backup resource pool. The resource map can be built, in some embodiments at least, by way of a user interface connected with a backup server or any other device that hosts the backup application. Once built, the resource map can be updated 704 by a user, and/or automatically, whenever a change takes place with respect to a backup resource. For example, updates can occur whenever a backup resource is updated, deleted, or modified. In some embodiments, the resource map is updated in real time as any one or more of the aforementioned and/or other changes occurs.

The resource map can also be updated 704 to reflect changes to rules included in the rules engine. For example, if a new data protection rule is defined, or an existing data protection rule modified, that specifies one or more backup resources not listed in the resource map, the resource map can be updated, automatically in some embodiments, or by a user, to include the new backup resources. In other embodiments, the resource map can be initially constructed to include all backup resources in the system where the rules engine operates and, as such, the resource map may not require updating when a data protection rule change is made.

One exception to such an arrangement is when a rule is deleted, and that rule specified a backup resource that was only used in connection with that particular data protection rule. In this case, the resource map may optionally be updated to remove that particular backup resource.

In any case, once the rules engine and resource map have been completed, a user can then specify 706 particular backup operations to be performed, and can also define a schedule for performance of the specified backup operation(s). This specification 706 can be performed using generic designations, examples of which are disclosed in more detail elsewhere herein. This specification can be performed by way of a user interface. In other cases, specification of backup operations and backup scheduling could be performed automatically by a backup application and/or other entity. As discussed in more detail elsewhere herein, example backup operations include 'backup,' 'clone,' and 'snapshot,' although the scope of the invention is not limited to these examples and, rather, extends more broadly to include any data protection process(s) and combinations thereof. The backup operations can be full backups, data deduplication backups, or any other type of backup.

After the backup operation(s), schedule, and any other variables have been specified, the smart engine can be connected 708. Connection of the smart engine can occur automatically, for example on a particular time schedule, or on the initiative of a user, such as by way of a user interface for example. In general however, connection of the smart engine 708 includes instantiation of a consultation of the rules engine and resource map in preparation for execution of a data protection process, such as the data protection process generically identified at 706.

When the smart engine has been connected 708, the resource map is checked 710 to determine which backup resources are available for the specified 706 data protection process, and the rules engine is also consulted 712 to determine, given the available backup resources, which rule most closely reflects the data protection process home that has been identified 706 and requested. In some embodiments, the resource map can be checked after the rules engine is consulted and, in still other embodiments, the resource map and rules engine can be checked and consulted, respectively, at about the same time.

In some instances, it may be the case that, given the backup resources indicated to be available by the resource map, there is no rule in the rules engine that would produce acceptable results when run. In such a case, a message can be generated and transmitted to a user or other entity indicating that insufficient resources are available to execute the requested data protection operation. As well, the rules engine and resource map can automatically be re-checked at a later time to determine whether the insufficient resource condition persists or there are adequate resources available. If the latter, the data protection operation can then be run, and, if the former, a further insufficient resource message can be generated and transmitted.

If adequate data protection resources are indicated to be available, the most optimum backup configuration, as reflected in a particular rule, is selected and the data protection process specified by that rule is performed 714. As used herein, the optimum configuration refers to that rule which most closely reflects the backup operation specified by the user, and the preferred resources for carrying out that backup operation.

For example, the rules may indicate that a backup operation is preferred to be performed by storing the backup on a disk, although it may also be acceptable, though less preferred, for the backup to be stored on tape. In this case, the optimal rule is the rule that specifies disk backup. If no disk is indicated by the resource map to be available, then the optimal rule becomes the rule that specifies tape backup, and the backup can still be performed but using tape instead of disk.

As the foregoing example demonstrates, the inherent flexibility in embodiments of the invention allows data protection processes to proceed notwithstanding ongoing changes to the backup resources that are available. As well, those changes can be readily, and automatically, accommodated and accounted for by application of rules in a particular manner, such as by using a most preferred to least preferred priority scheme. As such, no user intervention is required simply because a particular backup resource is not available. Instead, the system can simply consult the rules engine to determine if any alternative rules exist and, if so, the alternatives can be run automatically. If desired, this process can be made transparent to the user, or can be logged for later study and review by the user.

With continued reference to FIG. 5, the method 700 can conclude after the requested data protection process has been completed. Upon completion, the smart engine or other element of the backup application, such as a notifier component for example, can generate and send a notification 716 to a user, the system, and/or other entities, indicating that the data protection process has been completed. The notification can also include the rule(s) that were applied, the backup resources that were employed, the elapsed backup time, and start/finish times of the backup. Among other things, such information can help administrators track availability of backup resources, and also the utilization rates of backup resources. Of course, any other information associated with the backup process can additionally, or alternatively, be collected and reported.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for protecting data in a computing system, comprising:
   receiving input specifying one or more parameters of a data protection process, wherein each parameter identifies a different respective type of data protection operation;
   automatically consulting a resource map to identify backup resources that are available, wherein the resource map includes a list of a plurality of different types of backup resources that comprise physical storage media and/or virtual storage media;
   automatically checking a rules engine to identify a rule that correlates specific backup resource types to the one or more parameters of the data protection process and that, when executed, performs the data protection process using the available backup resources, wherein a particular data protection backup resource type employed in the data protection process is a function of one of the parameters of the data protection process; and
   when one or more rules are identified that correspond to the data protection process and that, when executed, performs the data protection process using the available backup resources, automatically selecting one of the identified rules and performing the specified data protection process using the selected rule.

2. The method as recited in claim 1, wherein the one or more parameters comprise one or more of taking a snapshot, cloning a snapshot, performing a backup, performing a rollover process, and storing a snapshot.

3. The method as recited in claim 1, wherein the selected rule is the rule that, as among the one or more rules identified, provides an optimum data protection process based on the backup resources indicated to be available.

4. The method as recited in claim 3, wherein the selected rule is the rule that, as among the one or more rules identified, least closely corresponds to the specified data protection process.

5. The method as recited in claim 1, wherein the data protection process is performed notwithstanding one or more changes to backup resources listed in the resource map.

6. The method as recited in claim 1, further comprising enabling or disabling a rule in the rules engine.

7. The method as recited in claim 1, wherein the parameters of the data protection process comprise one of 'backup only,' 'backup+clone,' 'snapshot only,' or 'snapshot+rollover+clone'.

8. The method as recited in claim 1, wherein the selected rule specifies a condition that if one or more first backup resources are not available for the data protection process, then the data protection process is to be performed with one or more alternate backup resources.

9. The method as recited in claim 1, further comprising automatically updating the resource map to reflect any one or more of an update to a listed backup resource, deletion of a listed backup resource, or a modification to a listed backup resource.

10. The method as recited in claim 1, wherein the particular backup resource to be employed for the data protection process is selected automatically based on the selected rule.

11. A non-transitory storage medium having stored therein computer-executable instructions which, when executed by one or more hardware processors, protect data by performing the processes recited in claim 1.

12. A physical device, wherein the physical device comprises:
    one or more hardware processors; and
    the non-transitory storage medium as recited in claim 11.

13. A method, comprising:
    building a resource map that includes a list of a plurality of different types of backup resources employable in connection with performance of a data protection process, wherein the backup resources comprise physical storage media and/or virtual storage media;
    automatically updating the resource map when a change occurs that is associated with a listed backup resource and/or when a new backup resource becomes available;
    defining a series of rules executable to govern performance of a data protection process, wherein a first rule of the series of rules is user-defined, and a second rule of the series of rules is system-defined, wherein one of the rules correlates specific backup resource types to one or more parameters of a data protection process and that rule, when executed, performs that data protection process using the available backup resources, and wherein a particular data protection resource type employed in the data protection process is a function of a parameter of the data process; and
    enabling or disabling one of the rules.

14. The method as recited in claim 13, wherein the rule associated with the data protection process specifies a condition that if one or more first backup resources are not available for the data protection process, then the data protection process is to be performed with one or more alternate backup resources.

15. The method as recited in claim 13, wherein each of the backup resources listed in the resource map is one of a device, a configuration, or hardware.

16. The non-transitory storage medium of claim 15, wherein the selected rule specifies a condition that if one or more first backup resources are not available for the data protection process, then the data protection process is to be performed with one or more alternate backup resources.

17. The non-transitory storage medium of claim 15, wherein the particular backup resource or resources to be employed for the data protection process are selected automatically based on the rule.

18. A non-transitory storage medium having stored therein computer-executable instructions which, when executed by one or more hardware processors, backs up data by performing the following processes:
    receiving input specifying one or more parameters of a data protection process, wherein each parameter identifies a different respective type of data protection operation;
    automatically consulting a resource map to identify backup resources that are available, wherein the resource map includes a list of a plurality of different types of backup resources that comprise physical storage media and/or virtual storage media;

automatically checking a rules engine to identify a rule that correlates specific backup resource types to the one or more parameters of the data protection process and that, when executed, performs the data protection process using the available backup resources, wherein a particular backup resource type employed in the data protection process is a function of one of the parameters of the data protection process; and when one or more rules are identified that correspond to the data protection process and that, when executed, perform the data protection process using the available backup resources, automatically selecting one of the identified rules and performing the specified data protection process using the selected rule.

19. A physical computing device, wherein the physical computing device comprises:
one or more hardware processors; and
the non-transitory storage medium as recited in claim 18.

* * * * *